United States Patent
Kondo et al.

(10) Patent No.: US 8,837,836 B2
(45) Date of Patent: Sep. 16, 2014

(54) IMAGE PROCESSING DEVICE IDENTIFYING ATTRIBUTE OF REGION INCLUDED IN IMAGE

(75) Inventors: Masaki Kondo, Toyoake (JP); Ryohei Ozawa, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 40 days.

(21) Appl. No.: 13/562,166

(22) Filed: Jul. 30, 2012

(65) Prior Publication Data

US 2013/0028520 A1     Jan. 31, 2013

(30) Foreign Application Priority Data

Jul. 29, 2011 (JP) .................................. 2011-167177

(51) Int. Cl.
- *G06K 9/46* (2006.01)
- *G06K 9/66* (2006.01)
- *G06T 7/40* (2006.01)
- *G06T 7/00* (2006.01)

(52) U.S. Cl.
CPC ..... *G06T 7/0048* (2013.01); *G06T 2207/20144* (2013.01); *G06T 2207/20076* (2013.01); *G06T 2207/20021* (2013.01); *G06T 7/408* (2013.01); *G06T 2207/10024* (2013.01)
USPC ............ 382/195; 382/164; 382/165; 382/190

(58) Field of Classification Search
CPC .................................................. G06K 9/00456
USPC .................. 382/164, 179, 195, 239, 298, 165
See application file for complete search history.

(56) References Cited

U.S. PATENT DOCUMENTS

| 6,104,832 A | 8/2000 | Saito et al. |
| 6,731,801 B2 | 5/2004 | Murakawa et al. |

(Continued)

FOREIGN PATENT DOCUMENTS

| EP | 0516576 A2 | 12/1992 |
| EP | 1006717 A2 | 6/2000 |

(Continued)

OTHER PUBLICATIONS

Klink, Stefan et al., Rule-based Document Structure Understanding with a Fuzzy Combination of Layout and Textual Features, International Journal of Document Analysis and Recognition, Jan. 1, 2001, XP55015513, Retrieved from the Internet: URL:http://citeseerx.ist.psu.edu/viewdoc/download?doi=10.1.1.28..4808&rep=rep1 &type=pdf [retrieved on Dec. 29, 2011].

(Continued)

*Primary Examiner* — Gregory M Desire
(74) *Attorney, Agent, or Firm* — Baker Botts L.L.P.

(57) ABSTRACT

An image processing device performs: preparing image data representing an image, the image including a target region consisting of a plurality of target pixels, each of the plurality of target pixels having a pixel value; classifying each of a plurality of target pixels as one of an object pixel and a background pixel other than the object pixel, the object pixel constituting an object represented in the target region; determining whether or not the target region satisfies a first condition related to a relationship between the object pixel and the background pixel to make a first determination result; and judging whether or not the target region is a letter region representing at least one letter based on the first determination result.

10 Claims, 10 Drawing Sheets

(56) References Cited

U.S. PATENT DOCUMENTS

| | | | |
|---|---|---|---|
| 7,343,046 B2 | 3/2008 | Curry et al. | |
| 7,505,174 B2 | 3/2009 | Matsumoto et al. | |
| 7,508,998 B2 * | 3/2009 | Shiiyama | 382/305 |
| 7,606,419 B2 * | 10/2009 | Koshi et al. | 382/176 |
| 7,773,776 B2 | 8/2010 | Adachi | |
| 7,844,118 B1 | 11/2010 | Li et al. | |
| 8,194,941 B2 * | 6/2012 | Hara | 382/124 |
| 8,208,774 B2 * | 6/2012 | Kudou et al. | 385/123 |
| 8,320,674 B2 * | 11/2012 | Guillou et al. | 382/179 |
| 8,396,298 B2 | 3/2013 | Dai | |
| 8,520,093 B2 * | 8/2013 | Nanu et al. | 348/224.1 |
| 2004/0247204 A1 * | 12/2004 | Lim et al. | 382/298 |
| 2005/0180645 A1 * | 8/2005 | Hasegawa et al. | 382/239 |
| 2006/0039608 A1 | 2/2006 | Nishida | |
| 2006/0115169 A1 * | 6/2006 | Ohk | 382/239 |
| 2007/0236707 A1 | 10/2007 | Shoda | |
| 2007/0286478 A1 | 12/2007 | Kishi | |
| 2007/0286507 A1 | 12/2007 | Mori | |
| 2008/0101698 A1 | 5/2008 | Yago | |
| 2008/0122877 A1 | 5/2008 | Aoyama | |
| 2009/0148039 A1 | 6/2009 | Chen et al. | |
| 2009/0297024 A1 | 12/2009 | Dai | |
| 2009/0310882 A1 | 12/2009 | Lin et al. | |
| 2010/0142806 A1 | 6/2010 | Malik et al. | |
| 2010/0142854 A1 | 6/2010 | Grunder | |
| 2010/0260417 A1 | 10/2010 | Dai | |
| 2010/0265549 A1 | 10/2010 | Kashibuchi et al. | |
| 2010/0310170 A1 | 12/2010 | Li et al. | |
| 2011/0158529 A1 | 6/2011 | Malik | |
| 2011/0222762 A1 | 9/2011 | Matsuguma et al. | |
| 2011/0252315 A1 * | 10/2011 | Misawa et al. | 715/256 |
| 2012/0057795 A1 * | 3/2012 | Konishi | 382/195 |
| 2013/0027732 A1 | 1/2013 | Ozawa et al. | |
| 2013/0028518 A1 | 1/2013 | Ozawa et al. | |
| 2013/0028520 A1 * | 1/2013 | Kondo et al. | 382/195 |
| 2013/0028524 A1 | 1/2013 | Kondo et al. | |
| 2013/0259365 A1 * | 10/2013 | Suzuki et al. | 382/164 |

FOREIGN PATENT DOCUMENTS

| | | |
|---|---|---|
| JP | H05-081474 A | 4/1993 |
| JP | H05-166002 A | 7/1993 |
| JP | H05-225378 A | 9/1993 |
| JP | H06-056618 B2 | 7/1994 |
| JP | H06-208625 A | 7/1994 |
| JP | H09-114922 A | 5/1997 |
| JP | 2001-127999 A | 5/2001 |
| JP | 2002-176564 A | 6/2002 |
| JP | 2004-362541 A | 12/2004 |
| JP | 2006-085665 A | 3/2006 |
| JP | 2007-310775 A | 11/2007 |
| JP | 2007-336000 A | 12/2007 |
| JP | 2008-282095 A | 11/2008 |
| JP | 2009-123206 A | 6/2009 |
| WO | 2008/039365 A1 | 4/2008 |

OTHER PUBLICATIONS

European Patent Office, extended European Search Report for European Patent Application No. 12178341.9 (counterpart European patent application), dated Nov. 5, 2012.

Pietikainen, Matti et al., "Edge-Based Method for Text Detection from Complex Document Images", Document Analysis and Recognition, 2001, Proceedings, Sixth International Conference on Seattle, WA, USA, Sep. 10, 2001, pp. 286-291.

Zhong, Yu, et al., "Automatic Caption Localization in Compressed Video", IEEE Transactions on Pattern Analysis and Machine Intelligence, IEEE Service Center, Los Alamitos, CA, USA, vol. 22, No. 4, Apr. 1, 2000, pp. 385-392.

Cheng, Shyi-Chyi, et al., "Visual Object Retrieval Via Block-Based Visual-Pattern Matching", Pattern Recognition, Elsevier, GB, vol. 40, No. 6, Mar. 18, 2007, pp. 1695-1710.

Haneda, Eri, et al., "Text Segmentation for MRC Document Compression", IEEE Transactions on Image Processing, IEEE Service Center, Piscataway, NJ, USA, vol. 20, No. 6, Jun. 1, 2011, pp. 1611-1626.

European Patent Office, extended European Search Report for European Patent Application No. 12178346.8 (counterpart European Patent Application), mailed Nov. 12, 2012.

United States Patent and Trademark Office, Non Final Rejection for U.S. Appl. No. 13/562,121 (related to above-captioned patent application), mailed Feb. 13, 2014.

* cited by examiner

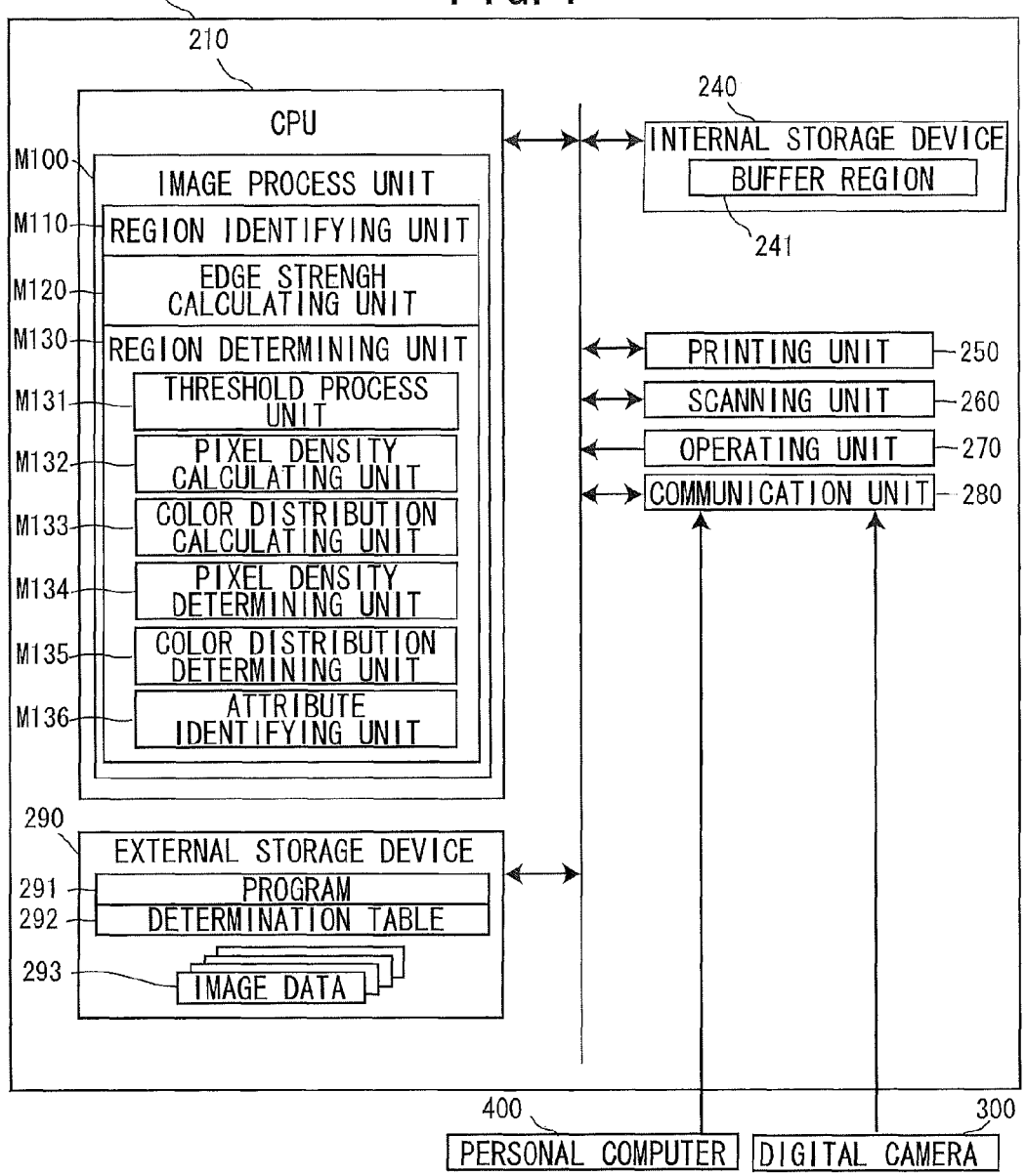

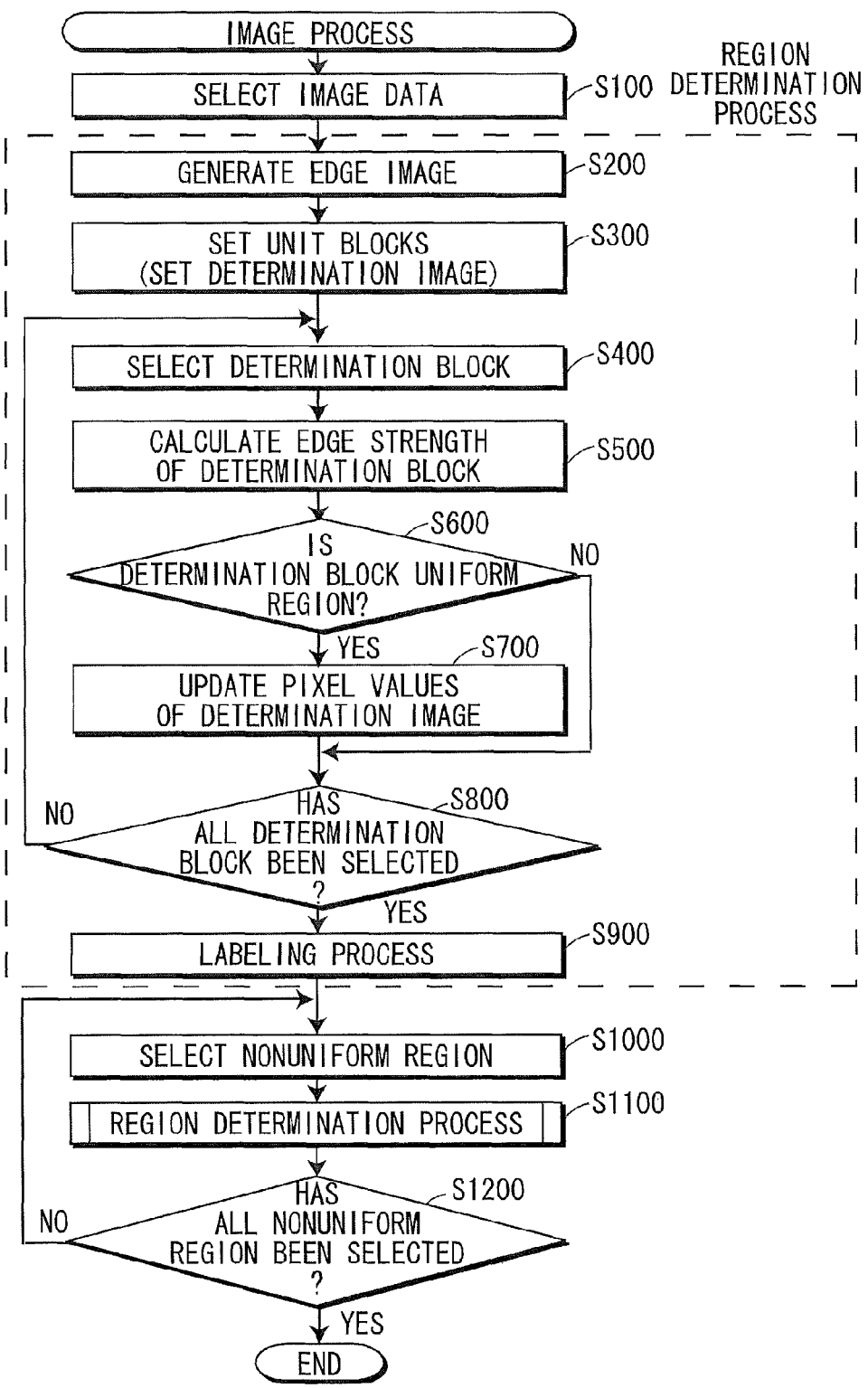

FIG. 4(A)

| | | | | BP | | BP | | | | | | BG | | | | | | | |
|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 0 | 0 | 0 | 0 | 1 | 1 | 1 | 0 | 0 | 0 | 0 | 0 | 0 | 0 | 1 |
| 1 | 1 | 1 | 1 | 1 | 0 | 0 | 0 | 0 | 1 | 1 | 1 | 0 | 0 | 0 | 0 | 0 | 0 | 0 | 1 |
| 1 | 1 | 1 | 1 | 1 | 0 | 0 | 0 | 0 | 1 | 1 | 1 | 0 | 0 | 0 | 0 | 0 | 0 | 0 | 1 |
| 1 | 1 | 1 | 1 | 1 | 1 | 1 | 1 | 1 | 1 | 1 | 1 | 0 | 0 | 0 | 0 | 0 | 0 | 0 | 1 |
| 1 | 1 | 0 | 0 | 0 | 0 | 0 | 0 | 0 | 0 | 1 | 1 | 0 | 0 | 0 | 0 | 0 | 0 | 0 | 1 |
| 1 | 1 | 0 | 0 | 0 | 0 | 0 | 0 | 0 | 0 | 1 | 1 | 1 | 1 | 1 | 1 | 1 | 1 | 1 | 1 |
| 1 | 1 | 0 | 0 | 0 | 0 | 0 | 0 | 0 | 0 | 1 | 1 | 0 | 0 | 0 | 0 | 1 | 1 | 1 | 1 |
| 1 | 1 | 0 | 0 | 0 | 0 | 0 | 0 | 0 | 0 | 1 | 1 | 0 | 0 | 0 | 0 | 1 | 1 | 1 | 1 |
| 1 | 1 | 0 | 0 | 0 | 0 | 0 | 0 | 0 | 0 | 1 | 1 | 0 | 0 | 0 | 0 | 0 | 0 | 0 | 1 |
| 1 | 1 | 0 | 0 | 0 | 0 | 0 | 0 | 0 | 0 | 1 | 1 | 0 | 0 | 0 | 0 | 0 | 0 | 0 | 1 |
| 1 | 1 | 1 | 1 | 1 | 1 | 1 | 1 | 1 | 1 | 1 | 1 | 0 | 0 | 0 | 0 | 0 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 |

| | | | | | | | | | | | | | | | | | | | |
|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 2 | 2 | 2 | 2 | 1 | 1 | 1 | 3 | 3 | 3 | 3 | 3 | 3 | 3 | 1 |
| 1 | 1 | 1 | 1 | 1 | 2 | 2 | 2 | 2 | 1 | 1 | 1 | 3 | 3 | 3 | 3 | 3 | 3 | 3 | 1 |
| 1 | 1 | 1 | 1 | 1 | 2 | 2 | 2 | 2 | 1 | 1 | 1 | 3 | 3 | 3 | 3 | 3 | 3 | 3 | 1 |
| 1 | 1 | 1 | 1 | 1 | 1 | 1 | 1 | 1 | 1 | 1 | 1 | 3 | 3 | 3 | 3 | 3 | 3 | 3 | 1 |
| 1 | 1 | 4 | 4 | 4 | 4 | 4 | 4 | 4 | 4 | 1 | 1 | 3 | 3 | 3 | 3 | 3 | 3 | 3 | 1 |
| 1 | 1 | 4 | 4 | 4 | 4 | 4 | 4 | 4 | 4 | 1 | 1 | 1 | 1 | 1 | 1 | 1 | 1 | 1 | 1 |
| 1 | 1 | 4 | 4 | 4 | 4 | 4 | 4 | 4 | 4 | 1 | 1 | 5 | 5 | 5 | 5 | 5 | 1 | 1 | 1 |
| 1 | 1 | 4 | 4 | 4 | 4 | 4 | 4 | 4 | 4 | 1 | 1 | 5 | 5 | 5 | 5 | 5 | 1 | 1 | 1 |
| 1 | 1 | 4 | 4 | 4 | 4 | 4 | 4 | 4 | 4 | 1 | 1 | 5 | 5 | 5 | 5 | 5 | 5 | 5 | 1 |
| 1 | 1 | 4 | 4 | 4 | 4 | 4 | 4 | 4 | 4 | 1 | 1 | 1 | 5 | 5 | 5 | 5 | 5 | 5 | 1 |
| 1 | 1 | 1 | 1 | 1 | 1 | 1 | 1 | 1 | 1 | 1 | 1 | 5 | 5 | 5 | 5 | 5 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 |

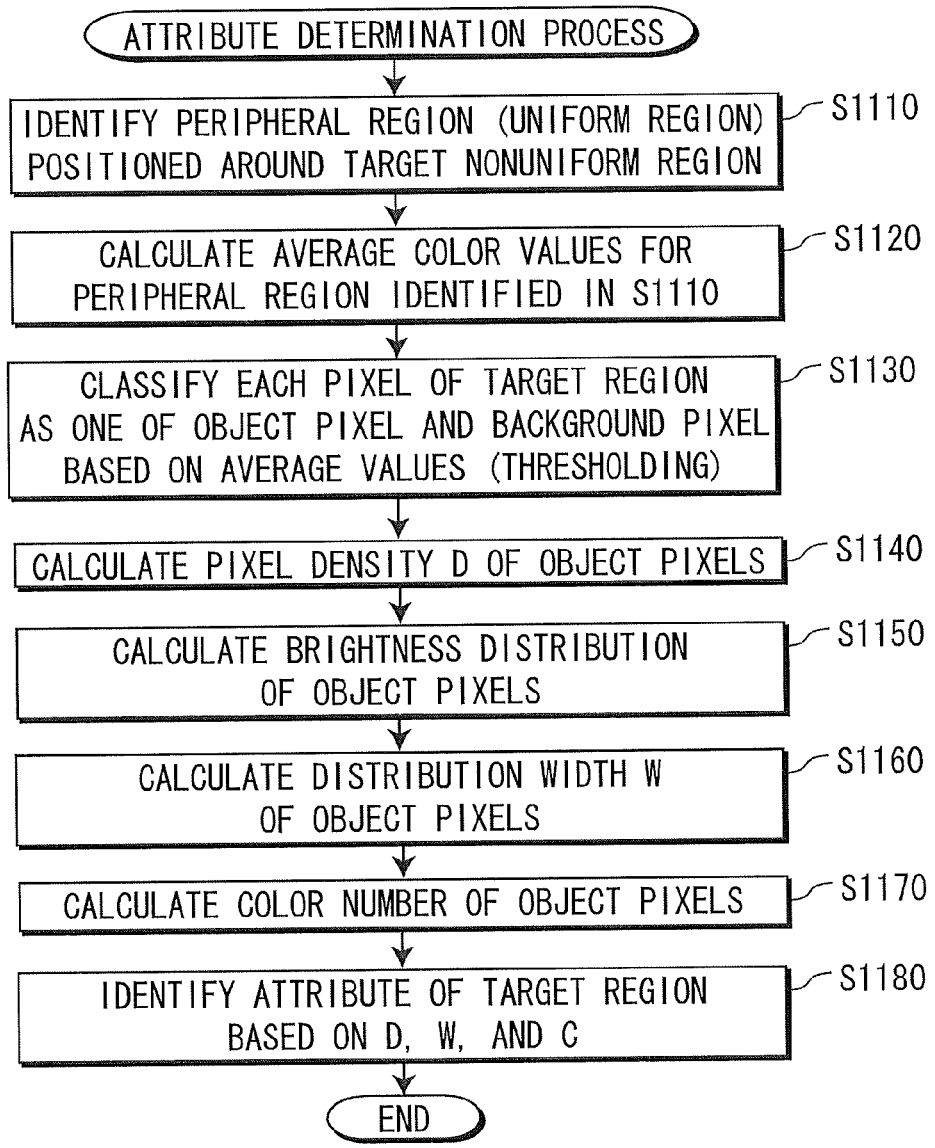

FIG. 7

| DISTRIBUTION WIDTH W | COLOR NUMBER C | PIXEL DENSITY D | ATTRIBUTE |
|---|---|---|---|
| GREATER THAN OR EQUAL TO Wth | GREATER THAN OR EQUAL TO Cth | GREATER THAN OR EQUAL TO Dth | PHOTO |
| | | SMALLER THAN Sth | PHOTO |
| | SMALLER THAN Cth | GREATER THAN OR EQUAL TO Dth | DRAWING |
| | | SMALLER THAN Dth | TEXT |
| SMALLER THAN Wth | GREATER THAN OR EQUAL TO Cth | GREATER THAN OR EQUAL TO Dth | PHOTO |
| | | SMALLER THAN Dth | TEXT |
| | SMALLER THAN Cth | GREATER THAN OR EQUAL TO Dth | DRAWING |
| | | SMALLER THAN Dth | TEXT |

IMAGE PROCESSING DEVICE IDENTIFYING ATTRIBUTE OF REGION INCLUDED IN IMAGE

CROSS REFERENCE TO RELATED APPLICATION

This application claims priority from Japanese Patent Application No. 2011-167177 filed Jul. 29, 2011. The entire content of the priority application is incorporated herein by reference.

TECHNICAL FIELD

The present invention relates to an image processing device, a non-transitory computer-readable storage medium, and a method for determining an attribute of target region.

BACKGROUND

There are techniques known in the art for determining the characteristics of target regions within an image based on image data representing the image. By correctly determining characteristics of the target regions, an image processor can perform image processing suited to these characteristics. According to one technology known in the art, an image processor divides an image into a plurality of blocks and calculates the contrast for each block. Subsequently, the image processor categorizes each block as a photograph, text, and the like based on their contrast.

SUMMARY

However, there is need for a technology to determine with greater accuracy whether a target region represents text (letter).

In view of the foregoing, it is an object of the present invention to provide a technology for determining with greater accuracy whether a target region represents text.

In order to attain the above and other objects, the invention provides an image processing device including a processor; and a memory storing computer readable instructions therein. The computer-readable instructions cause, when executed by the processor, the image processing device to perform: preparing image data representing an image, the image including a target region consisting of a plurality of target pixels, each of the plurality of target pixels having a pixel value; classifying each of the plurality of target pixels as one of an object pixel and a background pixel other than the object pixel, the object pixel constituting an object represented in the target region; determining whether or not the target region satisfies a first condition related to a relationship between the object pixel and the background pixel to make a first determination result; and judging whether or not the target region is a letter region representing at least one letter based on the first determination result.

According to another aspect, the present invention provides a non-transitory computer-readable storage medium storing computer-readable instructions that, when executed by a processor, cause an image processing device to perform: preparing image data representing an image, the image including a target region consisting of a plurality of target pixels, each of the plurality of target pixels having a pixel value; classifying each of the plurality of target pixels as one of an object pixel and a background pixel other than the object pixel, the object pixel constituting an object represented in the target region; determining whether or not the target region satisfies a first condition related to a relationship between the object pixel and the background pixel to make a first determination result; and judging whether or not the target region is a letter region representing at least one letter based on the first determination result.

According to another aspect, the present invention provides a method for controlling an image processing device. The method includes: preparing image data representing an image, the image including a target region consisting of a plurality of target pixels, each of the plurality of target pixels having a pixel value; classifying each of the plurality of target pixels as one of an object pixel and a background pixel other than the object pixel, the object pixel constituting an object represented in the target region; determining whether or not the target region satisfies a first condition related to a relationship between the object pixel and the background pixel to make a first determination result; and judging whether or not the target region is a letter region representing at least one letter based on the first determination result.

BRIEF DESCRIPTION OF THE DRAWINGS

In the drawings:

FIG. 1 is a block diagram showing a multifunction peripheral according to an embodiment of an invention;

FIG. 2 is a flowchart illustrating steps in an image process executed by the multifunction peripheral;

FIGS. 4(A) and (B) are examples of determination images;

FIG. 5 is a flowchart illustrating steps in the attribute determination process of S1100 shown in FIG. 2;

FIG. 7 is a table representing relationships between distribution width, color numbers, pixel density, and the attribute of the region;

DETAILED DESCRIPTION

Figure 3A:
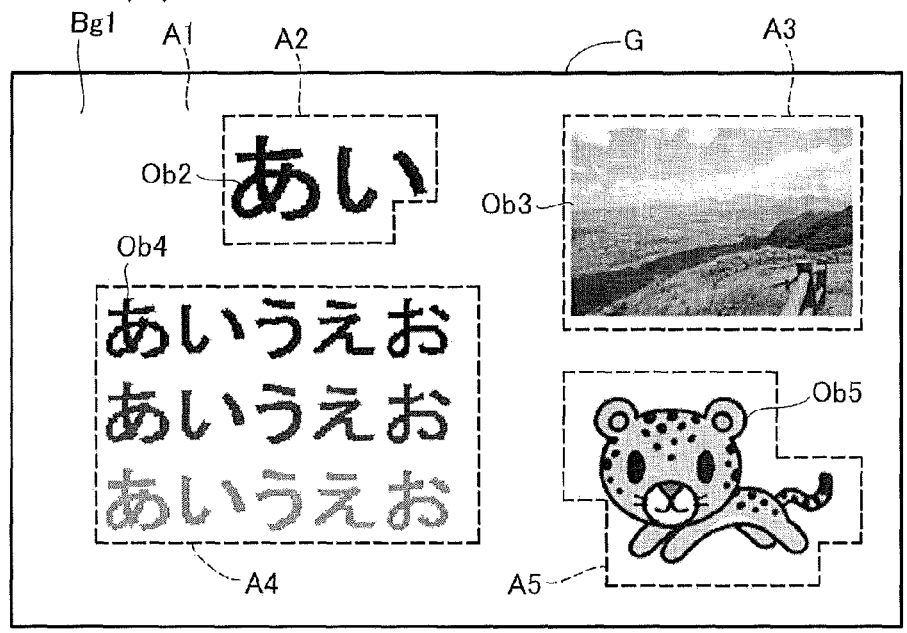
FIG. 3(A) is an example of an original image including a target image.

Next, an embodiment of the invention will be described while referring to the accompanying drawings. FIG. 1 is a block diagram showing a multifunction peripheral 200 serving as a first embodiment of the invention. The multifunction peripheral 200 includes a CPU 210; an internal storage device 240 having ROM and RAM; a printing unit 250 for printing images using a prescribed system (inkjet or laser, for example); a scanning unit 260 for reading an original using a photoelectric converting element (CCD or CMOS, for example); an operating unit 270, such as a touch panel; a communication unit 280 for communicating and exchanging data with an external device, such as a digital camera 300, a personal computer 400, or USB memory (not shown); and an external storage device 290, such as a hard disk drive or EEPROM.

The internal storage device 240 is provided with a buffer region 241 for temporarily storing various intermediate data generated when the CPU 210 performs processes. The external storage device 290 stores various computer programs 291 for controlling the multifunction peripheral 200, a determination table 292 referenced in an image process described later, and image data 293 that is subjected to the image process. The computer programs 291 may be supplied on a recording medium in a format that can be read by a computer. The recording medium may be a removable recording medium, such as a CD-ROM or USB storage, an internal storage device built into the computer, such as ROM or RAM, or an external storage device such as a hard disk drive that is connected to the computer. The image data 293 may include image data generated by the scanning unit 260 when scanning an original or may be image data acquired from an external device via the communication unit 280. The image data 293 that is acquired from an external device may be image data generated by the digital camera 300, or image data generated by an application program installed on the personal computer 400 for creating documents or images, for example.

By executing the computer programs 291, the CPU 210 functions as an image process unit M100 for executing an image process described later. The image process unit M100 includes a region identifying unit M110, an edge strength calculating unit M120, and a region determining unit M130. The region determining unit M130 further includes a threshold process unit M131, a pixel density calculating unit M132, a color distribution calculating unit M133, a pixel density determining unit M134, a color distribution determining unit M135, and an attribute identifying unit M136. The processes executed by these process units will be described next in greater detail.

The image process unit M100 executes a series of processes on image data to determine the content of an image represented by the image data. FIG. 2 is a flowchart illustrating steps in an image process.

In S100 at the beginning of the image process in FIG. 2, the image process unit M100 selects the image data to be subjected to the image process (original image data). In other words, the image process unit M100 prepares the image data representing the original image. For example, the image process unit M100 may receive an instruction from the user via the operating unit 270 indicating the original image data and may select the specified original image data from the image data 293 stored in the external storage device 290, where the image data 293 is data representing a plurality of images.

Figure 3B:
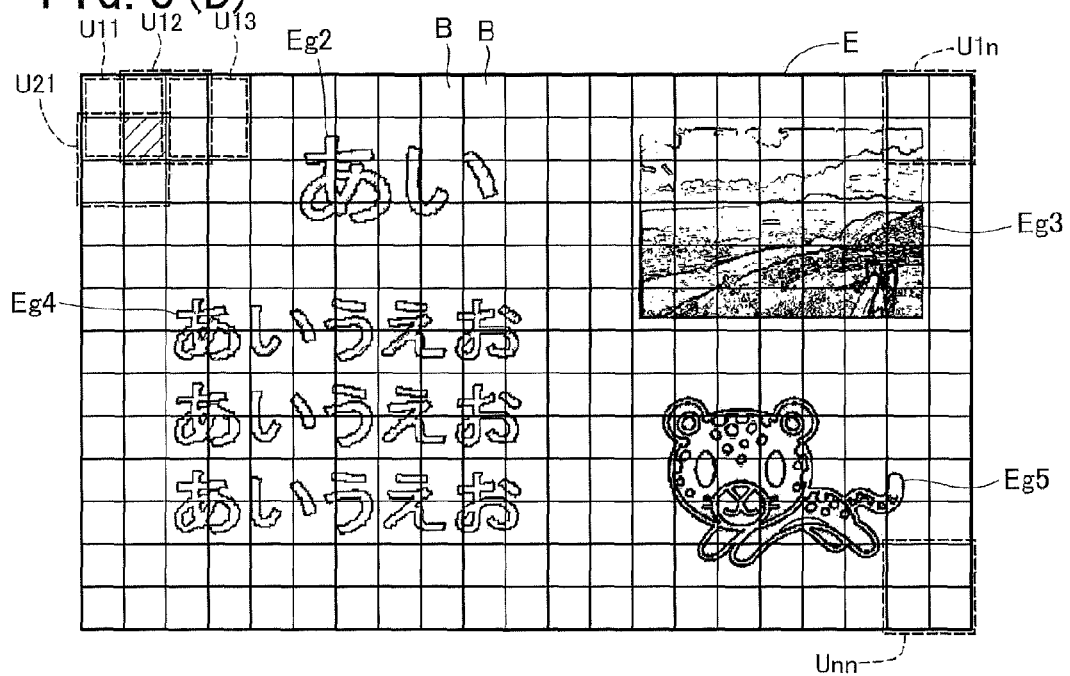
FIG. 3(B) is an example of an edge image generated based on the original image.

FIGS. 3(A) to 3(C) shows an example of an original image G represented by the original image data (FIG. 3(A)) and an edge image E represented by edge image data (FIG. 3(B)). The original image G includes a background image BG1, a first text object Ob2 and a second text object Ob4 representing text, a photograph object Ob3 representing a photograph, and a drawn object Ob5 representing a drawing, A "drawing" in the embodiment includes an illustration, table, diagram, pattern, and the like. The original image data in the following description will be bitmap data configured of RGB pixel data. The RGB pixel data includes three component values for red (R), green (G), and blue (B) (each component value being one of 256 gradation values, for example). The component values of pixel data will be called pixel values. The image process unit M100 performs the process described below after converting the original image data to bitmap data when the original image data is in a different data format.

In S200 the region identifying unit M110 of the image process unit M100 uses the original image data to create edge image data representing an edge image. The edge image data can be obtained by applying the Sobel filter to each component value for the plurality of RGB pixels constituting the original image data. The edge image data is configured of pixel data for a plurality of pixels. The pixel data for one pixel includes R, G, and B component values. Each of R, G, B component values of one pixel in the edge image data expresses an edge strength of the corresponding pixel in the original image for the corresponding color component. More specifically, a calculated component value $S(x, y)$ for one color component of a pixel subject to be processed (processed pixel) in the edge image at pixel position $(x, y)$ is calculated according to Equation 1 below using nine component values P of nine pixels corresponding to the processed pixel in the original image G.

$$S(x, y) = \left\| \begin{bmatrix} -1 & 0 & 1 \\ -2 & 0 & 2 \\ -1 & 0 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| + \left\| \begin{bmatrix} -1 & -2 & -1 \\ 0 & 0 & 0 \\ 1 & 2 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| \quad \text{Equation (1)}$$

As shown above in Equation (1), the nine pixels are positioned on all sides of the processed pixel corresponding to pixel position $(x, y)$ in the edge image. The first and second terms on the right side of Equation (1) are absolute values for the sum of values obtained by multiplying pixel values at the nine positions with corresponding coefficients. As can be seen from Equation (1), pixel data in the edge image (the edge strength of the pixels) is calculated using the difference between component values (pixel values) of adjacent first and second pixels in the original image. The edge image may be created using any of various edge detection filters, such as the Prewitt filter and Roberts filter, and is not limited to the Sobel filter.

FIG. 3(B) shows an edge image E based on the original image G shown in FIG. 3(A). In order to make the image more coherent in FIG. 3(B), pixels with low edge strength are depicted in white and pixels with high edge strength are depicted in black. The edge image E in this example includes edges Eg2-Eg5 for the corresponding objects Ob2-Ob5 of the original image G.

In S300 of FIG. 2, the region identifying unit M110 configures a plurality of unit blocks B (see FIG. 3(B)) for the edge image E. The unit blocks B are arranged as a grid in relation to the edge image E. A single unit block B is equivalent to the size of N×N unit pixels (where N is a predetermined natural number), a unit pixel being one pixel of the edge image E, for example. As will be described later, the unit block B is the smallest unit area in the original image that can be identified in the image process. N is any designed value. For example, N may be set to 10-50. Since the edge image E and original image G are identical in size (have the same number of pixels both vertically and horizontally), it is also possible to say that the unit blocks B are set for the original image G. The region identifying unit M110 sets a determination image BG corresponding to the configuration of unit blocks.

FIG. 4(A) shows a sample determination image BG. The determination image BG is configured of background pixels BP corresponding to the plurality of unit blocks B described above. The value of each pixel in the determination image BG is used to represent various information related to the corresponding unit block B (such as region identification data described later). When configuring the determination image BG, the region identifying unit M110 initializes the value of all pixels in the determination image BG to "0".

In S400 the region identifying unit M110 selects a determination block to be subjected to processing from among the plurality of unit blocks B according to a predetermined selection order. In the embodiment, one determination block is configured of four unit blocks B arranged in two rows and two columns. The first determination block selected is an upper leftmost determination block U11 in the edge image E (see FIG. 3(B)). Thereafter, the region identifying unit M110 sequentially selects a determination block U12 shifted rightward from the determination block U11 by one unit block B, a determination block U13 shifted rightward from the determination block U12 by one unit block B, and so one (see FIG. 3(B)). After the region identifying unit M110 selects a determination block Uln in the upper right corner of the edge image E as a result of sequentially selecting blocks shifted by one unit block B to the right, the region identifying unit M110 subsequently selects a determination block U21 shifted exactly one unit block B downward from the determination block U11 (see FIG. 3(B)). Thereafter, the region identifying unit M110 again selects determination blocks shifted sequentially one unit block B rightward from the determination block U21. With this selection method, a single unit block B is included in a plurality of determination blocks and, hence, is selected a plurality of times. For example, the unit block B positioned as the second block from the left edge and the second block from the top edge and indicated by shading in FIG. 3(B) is selected four times.

In S500 the edge strength calculating unit M120 calculates the edge strength of the target determination block (region edge strength). Specifically, the edge strength calculating unit M120 in the embodiment calculates the average values (ERave, EGave, and EBave) of component values (R, G, and B) for all pixels of the edge image E included in the determination block (the four unit blocks B) as a characteristic value indicating the region edge strength. Here, the characteristic values indicating the region edge strength may be determined using the median or mode of each component value or the number of pixels having at least one component that exceeds a predetermined threshold.

In S600 the region identifying unit M110 determines whether the target determination block (the four unit blocks B) is a uniform block. A "uniform block" is a region for which the region edge strength is less than a prescribed reference. In the embodiment, the region identifying unit M110 compares the three characteristic values indicating the region edge strength for the target determination block (ERave, EGave, and EBave) to reference values ETr, ETg, and ETb preset for each of the characteristic values. If ERave<ETr, EGave<ETg, and EBave<ETb, the region identifying unit M110 judges that the target determination block is a uniform block. However, if even one of the expressions ERave≥ETr, EGave≥ETg, and EBave≥ETb is satisfied, the region identifying unit M110 judges that the target determination block is not a uniform block. The image process unit M100 advances to S700 when determining that the target determination block is a uniform block (S600: YES) and advances directly to S800 while skipping S700 when determining that the target determination block is not a uniform block (S600: NO).

In S700 the region identifying unit M110 updates the pixel values of the determination image BG based on the determination result in S600. More specifically, the region identifying unit M110 sets the value of each pixel corresponding to the four unit blocks B determined to constitute a uniform block to "1".

In S800 the region identifying unit M110 determines whether the above determination has been performed for all determination blocks. If there remain determination blocks that have not been selected (S800: NO), the region identifying unit M110 returns to S400 and selects a new determination block to be processed. When the process has been performed for all determination blocks (S800: YES), the region identifying unit M110 advances to S900.

FIG. 4(A) shows an example of the determination image BG at the point the region identifying unit M110 has advanced to S900. Since any one unit block B belongs to a plurality of determination blocks, the region identifying unit M110 can perform a plurality of determinations (S600) for a single unit block B. All unit blocks B that have been determined to belong to a uniform block even one time are ultimately classified as uniform blocks, while all unit blocks B that were determined to belong to a nonuniform block for each time are ultimately classified as nonuniform blocks. When the region identifying unit M110 advances to S900, pixel values for all pixels in the determination image BG have been set to either "0" or "1". The pixel value "0" indicates that the unit block B corresponding to the pixel was classified as a nonuniform block, while the pixels value "1" indicates that the unit block B corresponding to the pixel was classified as a uniform block.

In S900 the region identifying unit M110 executes a labeling process to sort all of the unit blocks B into a plurality of groups and to assign an identifier to each group. More specifically, the region identifying unit M110 groups together a plurality of contiguous pixels in the determination image BG whose pixel values are "0" and groups together a plurality of contiguous pixels whose pixel values are "1". The region identifying unit M110 updates the pixel values in the determination image BG so that pixels belonging to the same group have the same value and pixels belonging to different groups have different pixel values. This process results in identifying regions of the determination image BG configured of pixels having the same pixel value.

FIG. 4(B) shows an example of the determination image BG following the labeling process. In the example shown in FIG. 4(B), five image regions PG1-PG5 have been identified. Thus, the above process identifies image regions in the original image G having minimum units of unit blocks B that correspond to image regions identified in the determination image BG. Based on the above description, pixel values in the determination image BG following the labeling process can be called "region identifiers" that identify image regions in the original image G.

In the examples of FIGS. 3(A) to 4(B), image regions A1-A5 (see FIG. 3(A)) corresponding to the background image BG1, first text object Ob2, photograph object Ob3, second text object Ob4, and drawn object Ob5 are identified as image regions in the original image G corresponding to the image regions PG1-PG5 in the determination image BG (see FIG. 4(B)). Image regions identified in the original image G are either nonuniform or uniform regions. A nonuniform region corresponds to unit blocks B classified as nonuniform blocks, while a uniform region corresponds to unit blocks B classified as uniform blocks. In the example of FIG. 3(A), the image region A1 corresponding to the background image BG1 is a uniform region, while the image regions A2-A5 corresponding to the objects Ob2-Ob5 are nonuniform regions. A nonuniform region is basically an area surrounded by a uniform region since, as described above, contiguous nonuniform blocks are identified as a single image region (nonuniform region).

As should be clear from the above description, the process from S200 to S900 is a region identification process for identifying nonuniform regions and uniform regions positioned around (adjacent to) the nonuniform regions.

In S1000 of FIG. 2, the image process unit M100 selects one nonuniform region from among all nonuniform regions identified in the original image G (the image regions A2-A5) as a target region. In S1100 the region determining unit M130 of the image process unit M100 executes a region determination process for determining the attribute of the nonuniform region selected as the target region.

FIG. 5 is a flowchart illustrating steps in the region determination process. In S1110 of FIG. 5 the region determining unit M130 identifies a uniform region positioned around the target nonuniform region (hereinafter the region positioned around the target nonuniform region will be referred to as a "peripheral region"). In other words, the region determining unit M130 identifies a region of the image as one of the target region and the peripheral region. For example, if the target nonuniform region is the image region A2 in FIG. 3(A), the region determining unit M130 identifies the entire image region A1 corresponding to the background image BG1 as the peripheral region. Alternatively, the region determining unit M130 may identify just a portion of the image region A1, such as the portion nearest the target image region A2, as the peripheral region. For example, the region determining unit M130 may set the peripheral region to the portion of the image corresponding to the portion of the determination image BG denoted with the symbol RG2 in FIG. 4(B), i.e., a ring-like region in the image region A1 having a prescribed width (a width of one unit block B, for example) and surrounding the periphery of the target image region.

In S1120 the region determining unit M130 calculates average color values ARave, AGave, and ABave for the peripheral region of the original image G identified in S1110. In other words, the region determining unit M130 calculates the average value of each component value (pixel value) in the RGB image data for all peripheral pixels constituting the peripheral region. Here, the mode, median, or other value may be used in place of the average value.

In S1130 the threshold process unit M131 of the region determining unit M130 performs thresholding on the target region using the average values ARave, AGave, and ABave. That is, the threshold process unit M131 converts the pixel values of each pixel constituting the target image to "0" or "1", thereby classifying each pixel constituting the target region as an object pixel corresponding to "1" or a background pixel corresponding to "0". The object pixel constitutes an object represented in the target region. The background pixel is other than the object pixel. More specifically, the value of a pixel i is set to "0" when the component values $Ri$, $Gi$, and $Bi$ in the RGB pixel data for the pixel i constituting the target region satisfy all Equations (2)-(4) below, and "1" when the component values $Ri$, $Gi$, and $Bi$ do not satisfy even one of the Equations (2)-(4).

$$ARave - Th1 < Ri < ARave + Th1 \quad \text{Equation (2)}$$

$$AGave - Th1 < Gi < GRave + Th1 \quad \text{Equation (3)}$$

$$ABave - Th1 < Bi < BRave + Th1 \quad \text{Equation (4)}$$

From Equations (2)-(4), it can be seen that pixel i is classified as a background pixel when the absolute values of the difference between the average color values (average pixel values) in the peripheral region and the component values (pixel values) of pixel i are less than a threshold Th1. The pixel i is classified as an object pixel when the absolute values of the difference between each average color value in the peripheral region and the component value of pixel i are greater than or equal to the threshold Th1.

In S1140 the pixel density calculating unit M132 calculates a pixel density D of object pixels. The pixel density D indicates the ratio of object pixels occupying the target region and is represented by Equation 5 below.

$$D = No/Na = No/(No + Nb) \quad \text{Equation (5)}$$

In Equation (5), No represents the number of object pixels, Na the total number of pixels constituting the target region, and Nb the number of background pixels. Since Equation 5 can be expressed as $D = 1/\{1 + (Nb/No)\}$, the pixel density D can be viewed as a characteristic value corresponding to the ratio of the number No of object pixels to the number Nb of background pixels.

In S1150 the color distribution calculating unit M133 calculates a brightness distribution for pixels constituting the target region. In the embodiment, the color distribution calculating unit M133 calculates the brightness distribution for object pixels among the pixels constituting the target region.

Figure 6A:
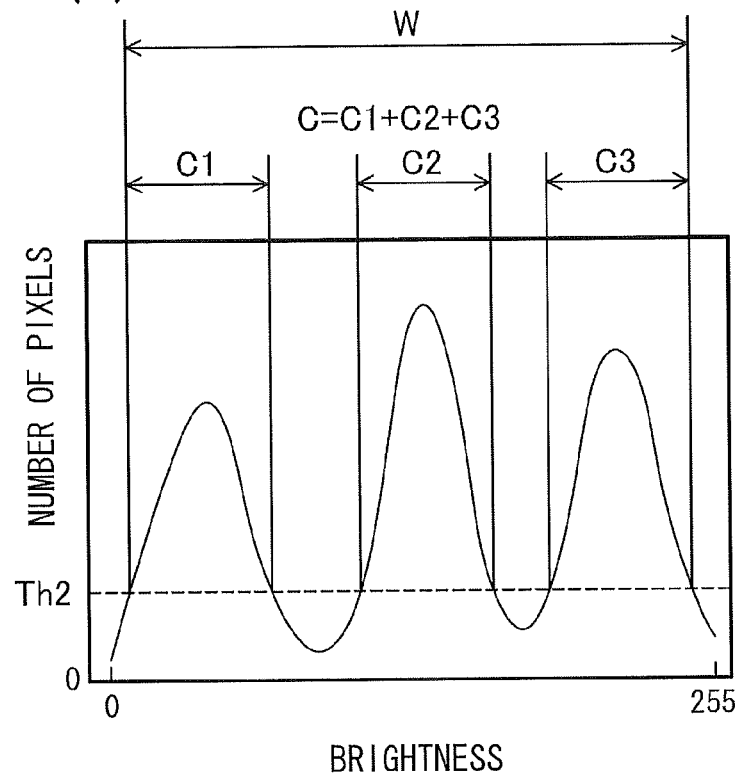
FIG. 6(A) is a histogram representing brightness distribution in the embodiment.

The graph in FIG. 6(A) shows an example of histograms representing the brightness distribution. The histogram in FIG. 6(A) is produced by plotting pixel counts on the vertical axis for each of the 256 brightness values Y on the horizontal axis. The color distribution calculating unit M133 generates brightness distribution data represented by a histogram like that shown in FIG. 6(A). That is, the color distribution calculating unit M133 calculates the brightness value Y for all object pixels and counts the number of pixels having this brightness value Y for each gradation that the brightness value Y can represent (among 256 gradations in this example). The color distribution calculating unit M133 calculates the brightness value Y for each pixel constituting the target image by inserting the RGB pixel data (R, G, and B) into Equation (6) below, for example.

$$Y = ((0.298912 \times R) + (0.586611 \times G) + (0.114478 \times B)) \quad \text{Equation (6)}$$

In S1160 the color distribution calculating unit M133 calculates a distribution width W using the brightness distribution (brightness distribution data) calculated in S1150. In the preferred embodiment, the distribution width W is the difference between the minimum value and maximum value of brightness values Y for which the pixel count exceeds a threshold Th2 (FIG. 6(A)). The distribution width W is a characteristic value representing a characteristic of the brightness distribution and can be said to indicate the width of the distributed range of brightness values.

In S1170 the color distribution calculating unit M133 calculates a color number C using the brightness distribution calculated in S1150. As shown in FIG. 6(A), the color number C in the preferred embodiment is the number of brightness values Y for which the pixel count exceeds the threshold Th2. Since the color of these pixels differs for different brightness values Y, the number of different brightness values Y (the number of types of brightness values Y) represents the number of colors (the number of types of colors). Hence, the color number C can be considered a characteristic value indicating the number of different brightness values Y.

In S1180 the region determining unit M130 identifies the attribute of the target region based on the pixel density D, distribution width W, and color number C described above. For example, the region determining unit M130 determines whether each of the pixel density D, distribution width W, and color number C satisfy a prescribed condition to make a determination result. More specifically, the pixel density determining unit M134 of the region determining unit M130 determines whether the pixel density D of object pixels in the target region is greater than or equal to a pixel density reference Dth. Next, the color distribution determining unit M135 of the region determining unit M130 determines whether the distribution width W is greater than or equal to a distribution width reference Wth. The color distribution determining unit M135 also determines whether the color number C is greater than or equal to a color number threshold Cth. Subsequently, the attribute identifying unit M136 of the region determining unit M130 identifies the attribute of the target region using the determination result for the pixel density D found by the pixel density determining unit M134, and determination results for the distribution width W and color number C found by the color distribution determining unit M135.

FIG. 7 shows an example of the determination table 292. The attribute identifying unit M136 references the determination table 292 (reference data) stored in the external storage device 290 (see FIG. 1) to identify the attribute of a target region. As shown in FIG. 7, the determination table 292 correlates attributes of a target region with combinations of determination results for conditions related to the pixel density D, determination results for conditions related to the distribution width W, and determination results for conditions related to the color number C. In other words, the determination table 292 in association with first condition data, second condition data, and attribute data. In this case, the attribute data indicates whether or not a region is the letter region (drawing, or photographic region), the first (second) condition data indicates whether or not a first (second) condition related to at least one of the pixel density D, distribution width W, and color number C is satisfied. After determining the attribute of the target region according to the determination table 292, the region determining unit M130 ends the region determination process.

In S1200 of FIG. 2, the region determining unit M130 determines whether all nonuniform regions have been selected and processed as the target region. If there remain unselected nonuniform regions (S1200: NO), the region determining unit M130 returns to S1000. The image process unit M100 ends the image process when all nonuniform regions have been selected and processed (S1200: YES). After the image process is completed, the image process unit M100 may execute an image correction process on each region whose attribute has been identified based on the identified attribute. For example, the image process unit M100 may perform processes to correct white balance, brightness, and the like in regions of the image identified as photographs, and may perform processes to enhance sharpness and contrast in regions identified as text. Here, text indicates at least one letter.

Figure 8A:
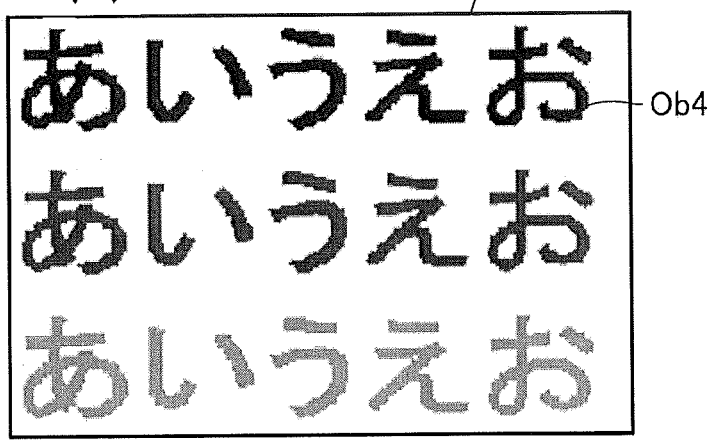
FIGS. 8(A) to 8(C) are explanatory diagrams showing a typical example of an image region with the attribute "text"
Figure 8B:
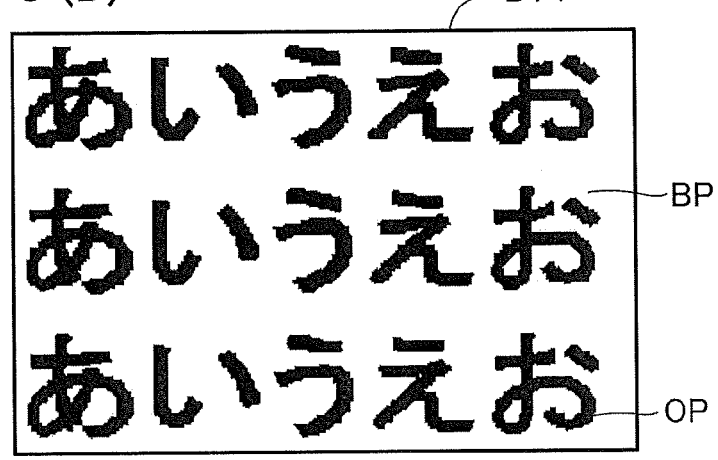
Figure 8C:
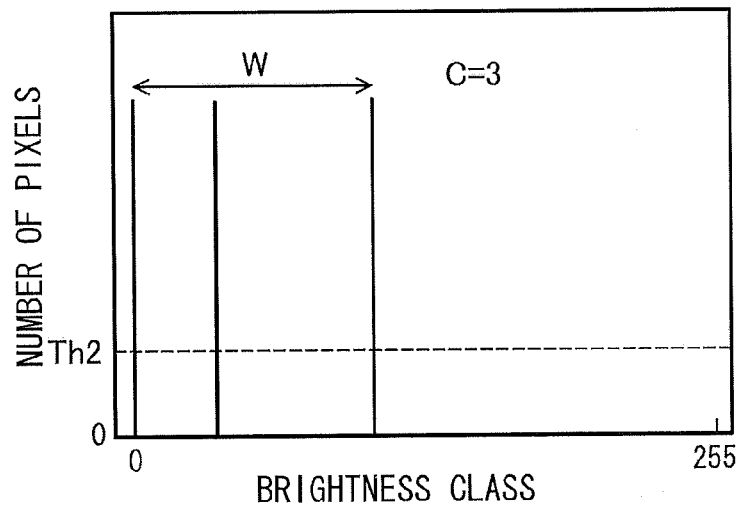

Here, some common examples of image regions with the attributes "text," "drawing," and "photo" will be given. FIGS. 8(A)-(C) are explanatory diagrams showing a typical example of an image region with the attribute "text." FIG. 8(A) shows the image region A4 of the original image G that includes the second text object Ob4. FIG. 8(B) shows a binary image BV4 produced by converting the image region A4 to binary values. FIG. 8(C) shows a histogram for the brightness distribution of object pixels OP in the image region A4.

The image region A4 in FIG. 8(A) includes text in three different colors. Consequently, the histogram of the image region A4 shown in FIG. 8(C) indicates that pixels in the image region A4 exist at only three brightness values corresponding to these three colors. Since characters are generally rendered with few colors, the color number C tends to be smaller when the attribute of an image is "text" than when the attribute is "photo." Further, as in the example shown in FIG. 8(B), the surface area occupied by the object pixels OP is smaller than the surface area occupied by the background pixels BP. Since characters are normally configured of lines and rarely include filled or solid regions, the ratio of the overall surface area of the region occupied by the object tends to be relatively small for images having the text attribute and, hence, the images tend to have a smaller pixel density D of object pixels OP than images having the attribute "photo" or "drawing" described below.

Further, images having the "text" attribute generally have a wider disparity in brightness between the color of the background pixels BP and the color of the object pixels OP so that the text is more legible. For example, the object pixels OP for text are generally depicted in colors with low brightness (dark colors, such as black) when the color of the background pixels BP has a high brightness (lighter color, such as white). Conversely, the object pixels OP of text are generally depicted in colors with high brightness when the color of the background pixels BP has a low brightness. Consequently, the distribution width W for an image with the "text" attribute is generally relatively small (see FIG. 8(C)).

Figure 9A:
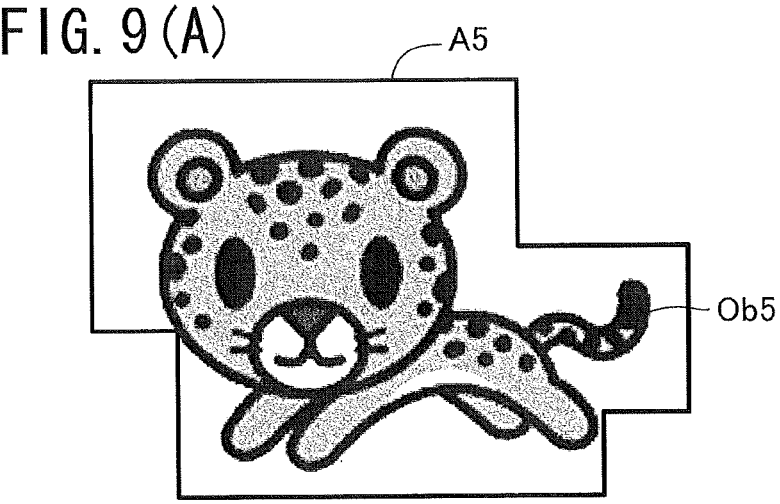
FIGS. 9(A) to 9(C) are explanatory diagrams showing a typical example of an image region with the attribute "drawing"
Figure 9B:
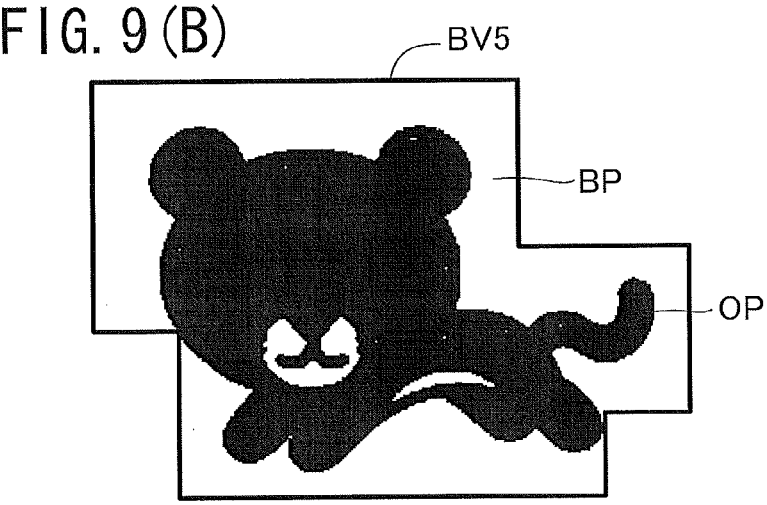
Figure 9C:
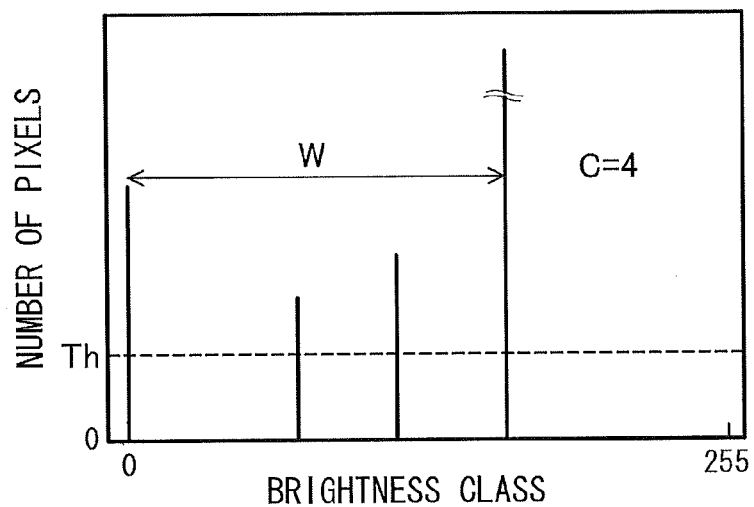

FIGS. 9(A) and 9(B) are explanatory diagram showing a typical example of an image region with the attribute "drawing." FIG. 9(A) shows the image region A5 of the original image G that includes the drawn object Ob5. FIG. 9(B) shows a binary image BV5 produced by converting the image region A5 to binary values. FIG. 9(C) shows a histogram of the brightness distribution of object pixels OP in the image region A5.

The drawing in the image region A5 in the example of FIG. 9(A) is depicting using four colors. The histogram of the image region A5 in FIG. 9(C) indicates that the drawing contains only pixels in four different brightness values corresponding to the four colors. Thus, images having the attribute "drawing" tend to have a smaller color number C than images having the attribute "photo" described later. Further, in the example of FIG. 9(B), the surface area occupied by the object pixels OP is greater than the surface area occupied by the background pixels BP. Since drawn images often include filled areas as well as lines, images with the attribute "drawing" tend to have a larger pixel density D of object pixels OP than images with the attribute "text."

Figure 10A:
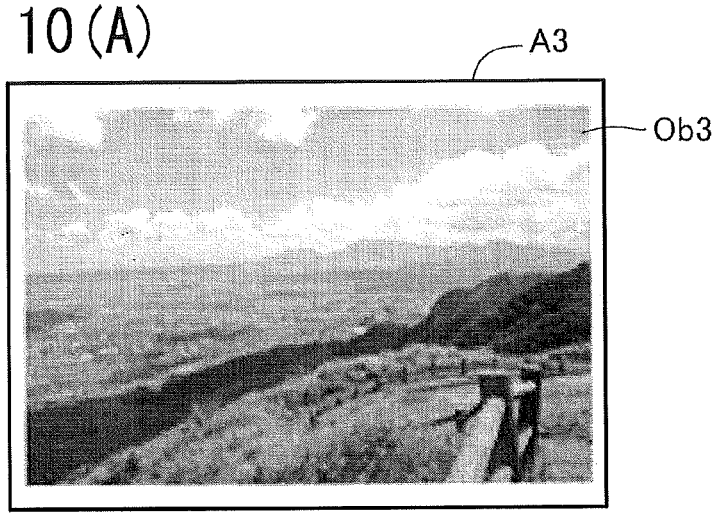
FIGS. 10(A) to 10(C) are explanatory diagrams showing a typical example of an image region with the attribute "photo".
Figure 10B:
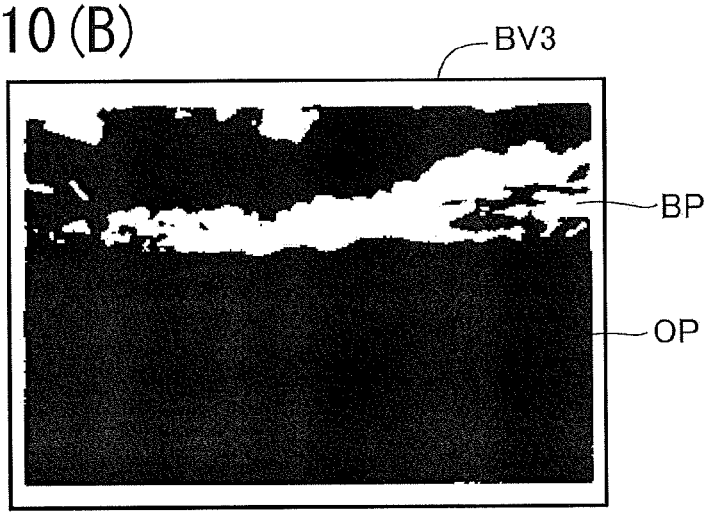
Figure 10C:
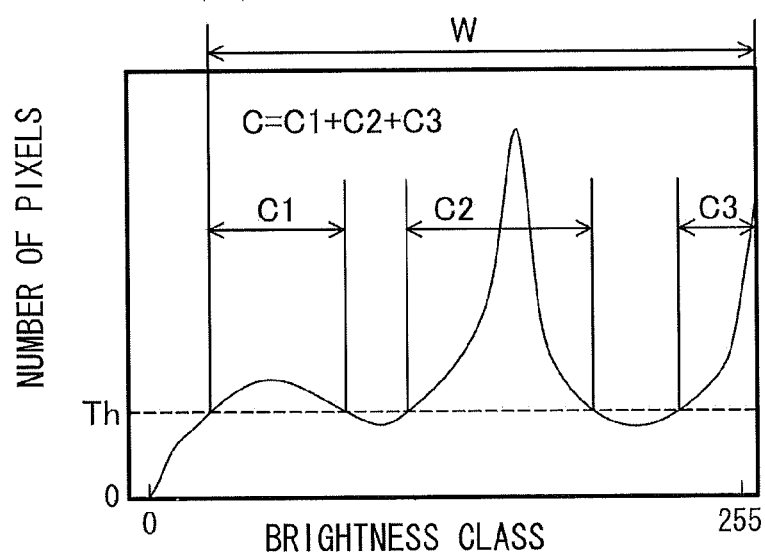

FIGS. 10(A) to 10(C) are explanatory diagrams showing a typical example of an image region with the "photo" attribute. FIG. 10(A) shows the image region A3 of the original image G that includes the photograph object Ob3. FIG. 10(B) shows a binary image BV3 created by converting the image region A3 to binary values. FIG. 10(C) shows a histogram depicting the brightness distribution of object pixels OP in the image region A3.

The image region A3 shown in FIG. 10(A) is a color-rich image that includes numerous colors. Accordingly, the histogram for the image region A3 shown in FIG. 10(C) indicates the existence of pixels depicted in numerous brightness values ranging over a broad spectrum of brightness values. Accordingly, images with the "photo" attribute tend to have a larger color number C and a larger distribution width W than images with the attribute "text" or "drawing" described above. In the example shown in FIG. 10(B), the surface area occupied by the object pixels OP is greater than the surface area occupied by the background pixels BP. Since photo regions are normally filled with pixels of a wide variety of colors, images with the "photo" attribute tend to have a larger pixel density D of object pixels OP than images with the "text" attribute.

As is clear from the determination table 292 in FIG. 7, the attribute of a target region is determined to be "text" in the following two cases.

(1-1) Color number C<Cth and pixel density D<Dth (1-2) Distribution width W<Wth and color number C≥Cth and pixel density D<Dth The attribute of the target region is determined to be "drawing" in the following case.

(2-1) Color number C<Cth and pixel density D≥Dth

Similarly, the attribute of the target region is determined to be "photo" in the following two cases.

(3-1) Distribution width W≥Wth and color number C≥Cth (3-2) Distribution width W<Wth and color number C≥Cth and pixel density D≥Dth Since the attribute of a target region is determined to be "text" for case (1-1) in the embodiment, the attribute of an image region having typical text characteristics (see FIGS. 8(A)-8(C)), i.e., a relatively low color number C and a relatively low pixel density D, can be accurately identified.

Further, since the attribute of a target region is determined to be "drawing" for case (2-1) in the embodiment, the attribute of an image region having typical drawing characteristics (see FIGS. 9(A)-9(C)), i.e., a relatively low color number C and a relatively high pixel density D, can be accurately identified.

Further, since the attribute of a target region is determined to be "photo" for case (3-1) in the embodiment, the attribute of an image region having typical photo characteristics (see FIGS. 10(A)-10(C)), i.e., a relatively large distribution width W and a relatively high color number C, can be accurately identified.

However, when the distribution width W is relatively small and the color number C relatively large, the target image does not seem likely to have typical characteristics of text or drawings, due to the relatively large color number C, and does not seem likely to have typical characteristics of a photo, due to the relatively small distribution width W. Such atypical cases will be described next.

When a target image has a relatively small distribution width W, a relatively large color number C, and a relatively small pixel density D, the characteristics of the image match those of text, owing to the relatively small distribution width W and relatively low pixel density D. The characteristics of the image conform to those of a photo only with respect to the relatively large color number C, and the image does not appear to have characteristics matching those of a drawing. Since the attribute of a target region is determined to be text in the case of 1-2 in the embodiment, the attribute of the target region can be accurately identified based on the high number of matching characteristics, even though the characteristics are atypical for text.

When the target image has a relatively small distribution width W, a relatively large color number C, and a relatively high pixel density D, the characteristics of the image conform to those of a photo, owing to the relatively large color number C and the relatively high pixel density D. In the case of a photo, it is easy to imagine cases in which the distribution width W of brightness is relatively small, such as dark photos that have been underexposed or bright photos that have been overexposed. On the other hand, the target image conforms to the characteristics of text only with respect to the relatively small distribution width W and conforms to the characteristics of a drawing only with respect to the relatively high pixel density D. Since the attribute of a target region is determined to be "photo" in the case of (3-2) in the embodiment, the attribute of the target region can be identified with accuracy based on the high number of matching characteristics, despite the target image being atypical for a photo.

As described above, the image process unit M100 of the embodiment determines whether the target image meets conditions related to pixel values of the object pixels, such as the distribution width W and the color number C, as well as a condition related to the pixel density D of object pixels. The image process unit M100 uses these determination results to identify the attribute of the target image accurately. More specifically, when the color number C is relatively low, there are cases in which it is difficult to identify whether the attribute of the target image is "text" or "drawing" based simply on the condition related to the color number C, as described above. However, the attribute of the target region can be accurately determined to be either "text" or "drawing" by determining a condition related to the pixel density D. Further, when the distribution width W is relatively small and the color number C is relatively large, it can be difficult to identify the attribute of a target image based only on conditions related to the distribution width W and color number C, but the attribute of the target region can be accurately determined to be either "text" or "photo" by determining a condition related to the pixel density D.

The region identifying unit M110 of the image process unit M100 also identifies nonuniform regions as target regions and uniform regions as peripheral regions surrounding the target regions. The threshold process unit M131 of the image process unit M100 categorizes the plurality of pixels constituting a target region as object pixels or background pixels using the values of the pixels constituting the peripheral region. Therefore, the image process unit M100 can accurately classify pixels of the target region as either object pixels or background pixels using values of pixels in the peripheral image.

More specifically, the region determining unit M130 calculates the average pixel value of pixels constituting the peripheral image, i.e., the average values ARave, AGave, and ABave for colors in the peripheral region. Next, the threshold process unit M131 classifies a pixel i constituting the target region as a background pixel when the absolute value of the difference between the average values of colors in the peripheral region and the component values component values Ri, Gi, and Bi of RGB pixel data for the pixel i is smaller than the threshold Th1, and classifies all pixels other than pixels classified as background pixels as object pixels. Through this process, it is possible to predict the color (pixel value) of the background pixel from the color of the peripheral region and to categorize the plurality of pixels constituting the target region as either background pixels or object pixels based on this prediction. Thus, the pixels constituting the target region can be accurately classified as background pixels or object pixels, even when the difference between the background pixels and object pixels is small, for example.

The image process unit M100 also identifies the differences in values among the plurality of pixels constituting a target unit block B using an edge detection filter in order to calculate the edge strength (ERave, EGave, and EBave) for the target unit block B. Subsequently, the edge strength calculating unit M120 determines whether the target unit block B is a uniform block by comparing the edge strength ERave, EGave, and EBave to reference values ETr, ETg, and ETb. Accordingly, the image process unit M100 can suitably identify nonuniform regions as target regions and uniform regions as peripheral regions.

The multifunction peripheral 200 also includes the external storage device 290, which stores the determination table 292. The determination table 292 correlates determination results based on conditions related to the pixel density D, determination results based on conditions related to the color number C and distribution width W, and attributes ("text," "drawing," and "photo"). The attribute identifying unit M136 of the region determining unit M130 can easily identify whether a target region is a text region using the determination table 292.

The region determining unit M130 can accurately identify the attribute of a target region using conditions related to the distribution width W and color number C. As described above, when the pixel density D of a target region is relatively high, it is difficult to determine whether the attribute of the target region is "drawing" or "photo" based solely on conditions related to the pixel density D. The region determining unit M130 in the preferred embodiment can accurately determine the attribute of a target region by additionally determining conditions of the distribution width W and color number C. Generally, the region determining unit M130 determines that the attribute of a target region is "text" when the pixel density D is smaller than the pixel density reference Dth. However, when the distribution width W is greater than or equal to the distribution width reference Wth and the color number C is greater than or equal to the color number threshold Cth, the region determining unit M130 determines that the attribute of the target region is "photo," irrespective of the value of the pixel density D. Thus, the region determining unit M130 can accurately identify the attribute of a target region using conditions related to the distribution width W and color number C.

While the invention has been described in detail with reference to the embodiment thereof, it would be apparent to those skilled in the art that various changes and modifications may be made therein without departing from the spirit of the invention.

Figure 6B:
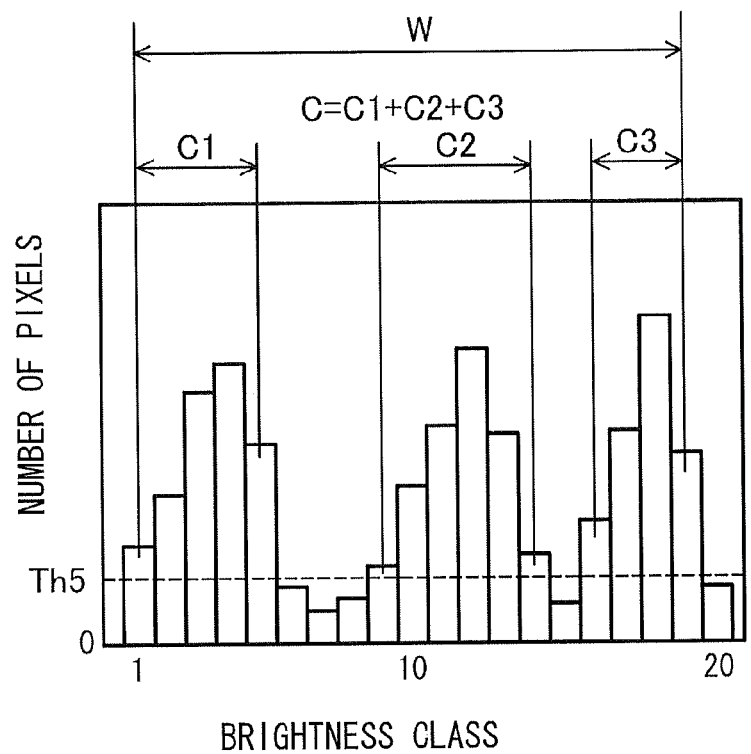
FIG. 6(B) is a histogram representing brightness distribution in a modification.

(1) In the above-described embodiment, the color distribution calculating unit M133 generates brightness distribution data represented by a histogram, such as that shown in FIG. 6(A), but the color distribution calculating unit M133 may instead generate brightness distribution data represented by a histogram like that in FIG. 6(B). In this example, the color distribution calculating unit M133 divides the possible gradations for the brightness value Y (a total of 256 gradations, for example) among a prescribed number, such as 20, of brightness classes. Brightness values Y for twelve or thirteen continuous levels are assigned to a single brightness class. The smaller the class number, the smaller the brightness values Y assigned to that class, while the larger the class number the larger the brightness values Y assigned to that class. For example, brightness values 0-12 are assigned to the brightness class having class number 1; brightness values 13-25 are assigned to the brightness class having class number 2; and so on, with brightness values 244-255 being assigned to the brightness class having class number 20. For each brightness class, the color distribution calculating unit M133 counts the number of pixels having brightness values Y that belong to that class in order to generate brightness distribution data.

In this case, the distribution width W may be a value representing the interval from the lowest effective class to the highest effective class using the number of brightness classes, as illustrated in FIG. 6(B). Here, the highest effective class is the brightness class to which the highest brightness value Y has been assigned from among all brightness classes having a larger pixel count than a threshold Th5 (referred to as "effective brightness classes"). The lowest effective class is the brightness class to which the lowest brightness value Y has been assigned from among all effective brightness classes. More specifically, the distribution width W may be expressed by W=Wmax=Wmin+1, where Wmax is the class number of the highest effective class and Wmin is the class number of the lowest effective class. In the example shown in FIG. 6(B), the distribution width W is 19−1+1=19. The color number C may also be expressed by the number of effective brightness classes. In the example shown in FIG. 6(B), the color number C is 15. Thus, the distribution width W is a characteristic value representing the distribution characteristic of brightness values Y and preferably has a correlation with the distribution range of brightness values. Alternatively, it could be said that the distribution width W is preferably an evaluation value capable of assessing the distribution range of brightness values. Similarly, the color number C is a characteristic value representing the distribution characteristic of the brightness value Y and preferably has a correlation with the number of different brightness values (the number of types). Alternatively, the color number C could be an evaluation value capable of assessing the number of different brightness values. Accordingly, by setting a distribution width reference Wth and a color number threshold Cth that are suitable for the possible values of distribution width W and color number C, the attributes of target regions can be suitably identified.

Note that the distribution width W and color number C are not restricted to being characteristic values for brightness values Y, but may instead be characteristic values for component values R, G, and B of pixel data or characteristic values for brightness in the HSB color space and the like. In other words, characteristic values may be used for a variety of values obtained based on pixel values or values acquired by converting pixel values. Generally, the distribution width W and color number C are preferably characteristic values representing distribution characteristics of the pixel values.

(2) A pixel density BD of background pixels may be employed in place of the pixel density D of object pixels described in the above-described embodiment. Since the object pixel density D and the background pixel density BD have the relationship D=1−BD, the background pixel density BD can be used to perform substantially the same determination as described in the embodiment by properly configuring the value of the pixel density reference Dth and inequality signs in the determination conditions. Similarly, the quotient obtained by dividing the number of object pixels by the number of background pixels or the quotient obtained by dividing the number of background pixels by the number of object pixels can be used to make a determination substantially identical to that in the embodiment. In general, it is preferable to employ a characteristic value corresponding to the percentage of the number of object pixels and the number of background pixels.

Further, the determining conditions for identifying the attribute of a target region are not limited to conditions related to the ratio of object pixels to background pixels, such as a condition related to the pixel density D, but may be one of a variety of conditions related to a relationship between the object pixels and background pixels. For example, it would be possible to employ a positional relationship between object pixels and background pixels in the target region by determining whether the object pixels and background pixels alternate along a specific direction, for example.

(3) The region determining unit M130 may also identify whether the attribute of the target image is "text" using only the pixel density D and not the color number C and distribution width W. Since it is likely that the attribute is "text" when the pixel density D of the object pixels is relatively low, the pixel density D can be used to identify accurately whether the attribute of the target image is "text."

(4) In the above-described embodiment, the average value of colors in the peripheral region is used to improve precision for classifying (thresholding) pixels in the target region, but this classification may be performed without use of the peripheral region. Since the peripheral region is not identified in this case, the computational load for classifying pixels in the target region can be reduced. Further, this method can identify the attribute of the target region, even when a peripheral region does not exist, such as when the entire image is the target region.

(5) In the above-described embodiment, target pixels constituting the target image are classified as object pixels or background pixels. Here, the object pixels constitute an object, which is targeted to determine the attribute of the target image, while the background pixels constitute all other pixels. Thus, when a blue object is the sole target for determining the attribute of a target image, pixels constituting the blue object in the target image are classified as object pixels, while all other pixels, such as pixels constituting objects in other colors, pixels constituting the background, and noise components, are classified as background pixels.

(6) In the above-described embodiment, the region determining unit M130 identifies a uniform region as the peripheral region, but the region determining unit M130 may identify a region of an arbitrary size existing alongside the outer edge of the target region to be the peripheral region, regardless of whether the region is uniform or nonuniform. Further, the region identifying unit M110 is not limited to using the edge strength of a region to identify a target region (nonuniform region) or to determine whether a region is uniform or nonuniform. For example, the region identifying unit M110 may identify target regions and peripheral regions based on a region specifying instruction received from the user via the operating unit 270. Similarly, determination results reached based on a lack of instructions from the user may also be received via the operating unit 270 to determine whether a region is uniform or nonuniform.

(7) The determination table 292 may be any type of determination data that the region determining unit M130 can reference and is not limited to a table format. Further, the determination table 292 or other determination data need not be stored in the external storage device 290. For example, the region determining unit M130 may access an external server or the like to acquire the determination data.

(8) The device used to implement the functions of the image process unit M100 is not limited to the multifunction peripheral 200 in the embodiment and may be configured of another type of device, such as a computer built into a printer, digital camera, seamier, or other image-related device; or a common personal computer, server, or other computing device. Further, rather than using a single unit device, the functions of the image process unit M100 may be implemented on a computing system having a plurality of computing devices in separate housings (for example, a distributed computing system for implementing cloud computing). In this case, the entire computing system that implements the functions of the image process unit M100 corresponds to the image processor of the present invention.

(9) Part of the processes implemented in hardware in the embodiment may be replaced with software processes, while conversely part of the processes implemented in software may be replaced with a hardware configuration.

What is claimed is:

1. An image processing device comprising:
a processor; and
a memory storing computer readable instructions therein, the computer-readable instructions, when executed by the processor, causing the image processing device to perform:
preparing image data representing an image, the image including a target region consisting of a plurality of target pixels, each of the plurality of target pixels having a pixel value;
classifying each of the plurality of target pixels as one of an object pixel and a background pixel other than the object pixel, the object pixel constituting an object represented in the target region;
determining whether or not the target region satisfies a first condition related to a relationship between the object pixel and the background pixel to make a first determination result;
judging whether or not the target region is a letter region representing at least one letter based on the first determination result;
identifying a region of the image as one of the target region and a peripheral region surrounding the target region based on the image data, the peripheral region consisting of a plurality of peripheral pixels each having a pixel value;
classifying each of the plurality of target pixels as one of the object pixel and the background pixel based on the pixel values of the plurality of peripheral pixels;
classifying a target pixel of the plurality of target pixels as the background pixel when a difference between a pixel value of the target pixel and an average value of the pixel values of the plurality of peripheral pixels is smaller than a second prescribed value; and
classifying the target pixel of the plurality of target pixels as the object pixel when the difference is greater than or equal to the second prescribed value.

2. The image processing device according to claim 1, wherein the computer-readable instructions, when executed by the processor, cause the image processing device to perform:
determining whether or not the target region satisfies a second condition related to the pixel values of the plurality of target pixels to make a second determination result; and
judging whether or not the target region is the letter region using both the first determination result and the second determination result.

3. The image processing device according to claim 2, wherein the memory stores reference data in association with first condition data, second condition data, and attribute data, the first condition data indicating whether or not the first condition is satisfied, the second condition data indicating whether or not the second condition is satisfied, the attribute data indicating whether or not a region is the letter region;
wherein the computer-readable instructions, when executed by the processor, cause the image processing device to perform identifying whether or not the target region is the letter region based on the reference data.

4. The image processing device according to claim 2, wherein the computer-readable instructions, when executed by the processor, cause the image processing device to perform calculating distribution data including at least one of a first distribution characteristic value and a second distribution characteristic value, the first distribution characteristic value being related to a distribution width of the pixel values of the target pixels, the second distribution characteristic value being related to a color number of colors included in the target region, each color being represented by at least one of the pixel values of the plurality of target pixels, the second condition being related to at least one of the first distribution characteristic value and the second distribution characteristic value.

5. The image processing device according to claim 1, wherein the computer-readable instructions, when executed by the processor, cause the image processing device to perform calculating a first characteristic value corresponding to a ratio of an object pixel number to a background pixel number, the object pixel number indicating number of the object pixels, the background pixel number indicating number of the background pixels, the first condition being related to the first characteristic value.

6. The image processing device according to claim 1, wherein the region of the image includes a first pixel and a second pixel other than the first pixel, each of the first pixel and the second pixel having a pixel value;
wherein the computer-readable instructions, when executed by the processor, cause the image processing device to perform:
calculating an edge strength of the region of the image by using a difference between the pixel values of the first pixel and the second pixel; and
identifying the region of the image as the target region when the edge strength is greater than or equal to a first reference value, whereas the identifying identifies the region of the image as the peripheral region when the edge strength is smaller than the first reference value.

7. The image processing device according to claim 1, wherein the computer-readable instructions, when executed by the processor, cause the image processing device to perform:
identifying a region of the image as one of the target region and a peripheral region surrounding the target region based on the image data, the peripheral region consisting of a plurality of peripheral pixels each having a pixel value;
classifying each of the plurality of target pixels as one of the object pixel and the background pixel based on the pixel values of the plurality of peripheral pixels; and
calculating a first characteristic value corresponding to a ratio of an object pixel number to a background pixel number, the object pixel number indicating number of the object pixels, the background pixel number indicating number of the background pixels, the first condition being related to the first characteristic value.

8. A non-transitory computer-readable storage medium storing computer-readable instructions that, when executed by a processor, cause an image processing device to perform:
preparing image data representing an image, the image including a target region consisting of a plurality of target pixels, each of the plurality of target pixels having a pixel value;
classifying each of the plurality of target pixels as one of an object pixel and a background pixel other than the object pixel, the object pixel constituting an object represented in the target region;
determining whether or not the target region satisfies a first condition related to a relationship between the object pixel and the background pixel to make a first determination result;
judging whether or not the target region is a letter region representing at least one letter based on the first determination result;

identifying a region of the image as one of the target region and a peripheral region surrounding the target region based on the image data, the peripheral region consisting of a plurality of peripheral pixels each having a pixel value;
classifying each of the plurality of target pixels as one of the object pixel and the background pixel based on the pixel values of the plurality of peripheral pixels;
classifying a target pixel of the plurality of target pixels as the background pixel when a difference between a pixel value of the target pixel and an average value of the pixel values of the plurality of peripheral pixels is smaller than a second prescribed value; and
classifying the target pixel of the plurality of target pixels as the object pixel when the difference is greater than or equal to the second prescribed value.

9. A method for controlling an image processing device, the method comprising:
preparing image data representing an image, the image including a target region consisting of a plurality of target pixels, each of the plurality of target pixels having a pixel value;
classifying each of the plurality of target pixels as one of an object pixel and a background pixel other than the object pixel, the object pixel constituting an object represented in the target region;
determining whether or not the target region satisfies a first condition related to a relationship between the object pixel and the background pixel to make a first determination result with a processor;
judging whether or not the target region is a letter region representing at least one letter based on the first determination result,
identifying a region of the image as one of the target region and a peripheral region surrounding the target region based on the image data, the peripheral region consisting of a plurality of peripheral pixels each having a pixel value;
classifying each of the plurality of target pixels as one of the object pixel and the background pixel based on the pixel values of the plurality of peripheral pixels;
classifying a target pixel of the plurality of target pixels as the background pixel when a difference between a pixel value of the target pixel and an average value of the pixel values of the plurality of peripheral pixels is less than a second prescribed value; and
classifying the target pixel of the plurality of target pixels as the object pixel when the difference is greater than or equal to the second prescribed value.

10. An image processing device comprising:
a processor; and
a memory storing computer readable instructions therein, the computer-readable instructions, when executed by the processor, causing the image processing device to perform:
preparing image data representing an image, the image including a target region consisting of a plurality of target pixels, each of the plurality of target pixels having a pixel value;
classifying each of the plurality of target pixels as one of an object pixel and a background pixel other than the object pixel, the object pixel constituting an object represented in the target region;
determining whether or not the target region satisfies a first condition related to a relationship between the object pixel and the background pixel to make a first determination result;

judging whether or not the target region is a letter region representing at least one letter based on the first determination result;

identifying a region of the image as one of the target region and a peripheral region surrounding the target region based on the image data, the peripheral region consisting of a plurality of peripheral pixels each having a pixel value;

classifying each of the plurality of target pixels as one of the object pixel and the background pixel based on the pixel values of the plurality of peripheral pixels, wherein the region of the image includes a first pixel and a second pixel other than the first pixel, each of the first pixel and the second pixel having a pixel value;

calculating an edge strength of the region of the image by using a difference between the pixel values of the first pixel and the second pixel; and identifying the region of the image as the target region when the edge strength is greater than or equal to a first reference value, whereas the identifying identifies the region of the image as the peripheral region when the edge strength is smaller than the first reference value.

* * * * *